United States Patent [19]

Braun et al.

[11] Patent Number: 4,589,675

[45] Date of Patent: May 20, 1986

[54] ACTIVE SUSPENSION SYSTEM

[75] Inventors: Dieter Braun; Herbert Mehren, both of Stuttgart, Fed. Rep. of Germany

[73] Assignee: Daimler-Benz Aktiengesellschaft, Fed. Rep. of Germany

[21] Appl. No.: 585,928

[22] Filed: Mar. 5, 1984

[30] Foreign Application Priority Data

Mar. 7, 1983 [DE] Fed. Rep. of Germany ....... 3308011

[51] Int. Cl.[4] .............................................. B60G 11/26
[52] U.S. Cl. ..................................... 280/707; 280/714
[58] Field of Search ............... 280/702, 703, 707, 708, 280/710, 711, 712, 714; 267/34, 64.21, 64.24, 64.25, 64.27; 188/285, 299, 319

[56] References Cited

U.S. PATENT DOCUMENTS

| 4,222,578 | 9/1980 | Meisel, Jr. ............................ 280/714 |
| 4,326,733 | 4/1982 | Rubalcava ........................... 280/708 |
| 4,468,739 | 8/1984 | Woods et al. ....................... 280/714 |

FOREIGN PATENT DOCUMENTS 2346279 4/1974 Fed. Rep. of Germany .

OTHER PUBLICATIONS

"Active Insulation of the Drivers Seat Against Vibration in Unsprung Vehicles", ATZ 1982, pp. 425–434.

Primary Examiner—John J. Love
Assistant Examiner—Ross Weaver
Attorney, Agent, or Firm—Craig & Burns

[57] ABSTRACT

A hydraulic support system has a first expandable chamber which is subjected to a constant pressure sufficient for compensating the static load. Two further chambers assigned to equally larger effective surface areas of pistons can be subjected to different pressures by means of a regulating and change-over device to cause active compression and rebound and a return to a middle position.

12 Claims, 3 Drawing Figures

ACTIVE SUSPENSION SYSTEM

The invention relates to an active suspension system, especially for motor vehicles, with a hydraulic support system, preferably designed as a piston/cylinder arrangement and absorbing static and dynamic loads, and with a program-controlled regulating device which controls the pressure in at least one hydraulic chamber expanding during rebound and in a further hydraulic chamber expanding during compression, which chambers belong to the support system, depending upon operating and driving states.

In contrast to conventional wheel suspensions, in which the vertical wheel movements during rebound and compression are damped either by shock absorbers or, when hydropneumatic struts are used, by means of hydraulic or pneumatic throttle points, by converting the vertical kinetic of energy of the wheel into thermal energy and dissipating it so as to compensate the wheel-load variations more or less effectively, in active suspension systems, the unevenness of the roadway is detected by a regulating system which actively controls, for example, an hydraulic support system according to a program to be predetermined, in such a way that the vertical movements of the wheel are matched to the unevenness of the roadway, and consequently, on the one hand, an improved wheel grip, with increased safety and, on the other hand, damping of the movements of the vehicle body, with increased driving comfort, are achieved.

It is therefore an object of the invention to provide an improved active suspension system for motor vehicles.

It is a further object of the invention to provide an active suspension system for motor vehicles with a hydraulic support system comprising a piston/cylinder arrangement for absorbing static and dynamic loads having plural hydraulic chambers and a program-control regulating device which controls as a function of operating and driving states the pressure in at least one chamber of the hydraulic chambers expanding during rebound and the pressure in a second of the hydraulic chambers expanding during compression, the first chamber expanding during rebound being responsive to a constant pressure essentially independent of the chamber volume to compensate static load, the regulating means regulating the pressures in two of the hydraulic chamber means which undergo substantially identical changes in volume during suspension movements as one of said two chamber means expands during the rebound and the other of said two chamber means expands during the compression.

A further object of the invention is to provide an active suspension system of the type mentioned in the introduction, which is distinguished, on the one hand, by simplicity in terms of construction and, on the other hand, in that, in particular, the regulating device and its program are suitable for different vehicle types or can easily be adapted to them.

This object is achieved when a first chamber of the support system, expanding during the rebound, can be subjected to a constant pressure, essentially independent of the chamber volume, to compensate the static load, and the regulating device regulates the pressures in two further chambers which undergo the same changes in volume during suspension movements and one of which expands during the rebound and the other during the compression.

The invention is therefore characterized in that the static loads causes exclusively by the suspended mass are absorbed by separated hydraulic components of the support system and can therefore be ignored in the influence exerted on the suspension movements or the vertical movements of the wheels of a vehicle. It is possible to ensure, in particular, that the control comments of the regulating device are converted into definite reproducible strokes of the suspension system or of the wheels, since the chamber expanding during the compression and the chamber expanding during the rebound have such dimensions that when the pressure differences in these chambers correspond to one another the same control speeds and control forces are obtained both in the compression direction and in the rebound direction.

According to an embodiment of the invention which is preferred from the point of view of construction, two piston/cylinder units with pistons of different cross sections, which can be subjected to pressure on both sides and which each have a smaller effective surface area facing the piston rod and a larger effective surface area facing away from the piston rod are provided as support means of the support system, in such a way that the smaller effective surface area of the first piston of larger cross section is of the same size as the larger effective surface area of the other piston; furthermore, at the same time, the chamber assigned to the larger effective surface area of the first piston, in the first piston/cylinder unit and the chamber, connected in parallel to the said chamber and assigned to the smaller effective surface area of the other piston, in the other piston/cylinder unit are subjected to the constant pressure, and the regulating device determines the changing pressures, if appropriate differing from one another, in the two remaining chambers (assigned to effective piston surface areas of the same size) of the piston/cylinder unit. Because two piston/cylinder units are provided, a simplification in construction is obtained since standard commercial parts of simple design and of suitable dimensions can be used. Moreover, even when long suspension movements are allowed, it is possible to have a small overall height which is only a little greater than that permissible for suspension movement.

A constant-pressure source formed by an adjustable pressure-limiting valve and a pressure source, for example a pump or the like, with an accumulator connected between the said constant-pressure source and the support system can be provided to absorb the static loads, this accumulator serving, above all, to prevent pressure peaks which could otherwise arise as a result of dynamic effects during compression and rebound.

The chambers assigned to the two effective piston surface areas of equal size can each be connected via a line to a change-over device which is controlled by the regulating device and which, on the one hand, allows the two lines to be connected to one another, if appropriate throttled, and or to the shut off and, on the other hand, allows either line to be connected to a pressure source when the other line is relieved of pressure at the same time. In this way, the regulating device can initiate or influence suspension movements in opposite directions in a simple way and can return the suspension system to a predetermined middle position monitored by sensors or retain it in this position.

Preferably provided as a chamber-over device, is a change-over means, for example a slide or the like, which is coupled to a hydraulic tank and a pressure source or pump and which can be changed over between positions in which either line is connected to the tank and the other line is connected to the pressure source, and positions in which the lines are shut off and/or are connected to one another, if appropriate with throttling.

These and other objects, features, and advantages of the present invention will be come more apparent from the following description when taken in connection with the accompanying drawings which show, for the purposes of illustration only, plural embodiments in accordance with the present invention, and wherein.

Figure 1:
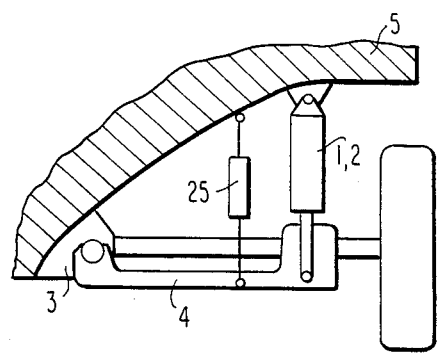
FIG. 1 shows a view of a wheel suspension in the longitudinal direction of the vehicle.
Figure 2:
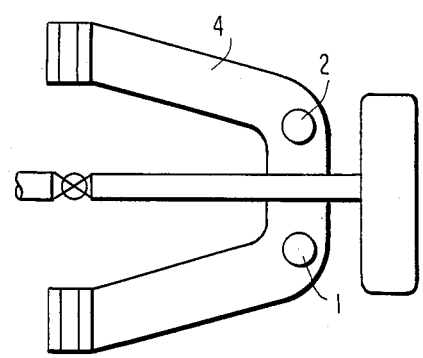
FIG. 2 shows a plan view of this wheel suspension.
Figure 3:
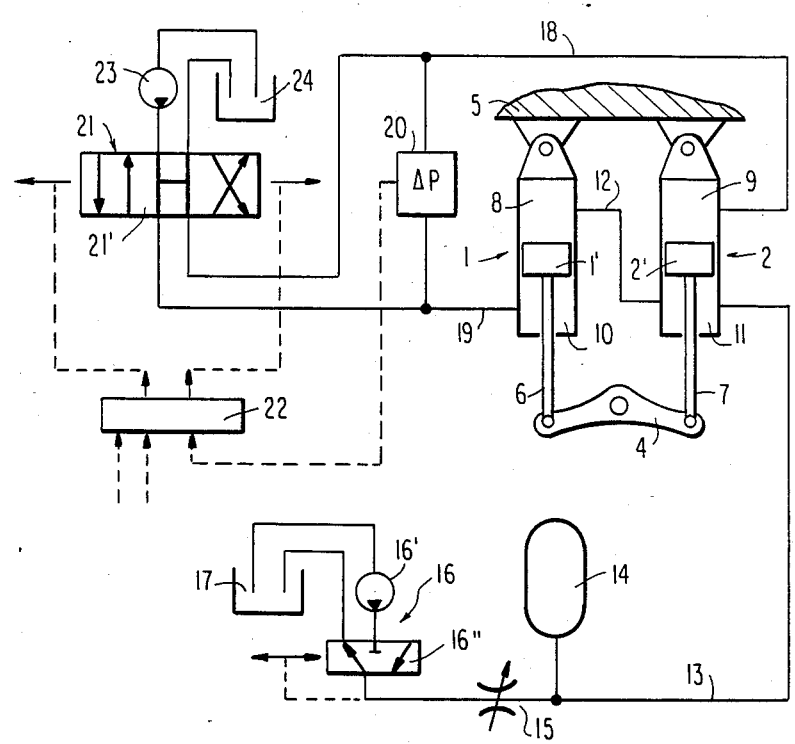
FIG. 3 shows a circular diagram of the support system with an associated regulating device.

Referring now to the drawings wherein like reference numerals identify like elements, FIG. 1 shows a transverse wishbone 4, which is movable on bearing blocks 3 about a pivot axis approximately parallel to the longitudinal axis of the vehicle and serving in a known way for guiding a wheel and is supported vertically relative to the vehicle body 5 by means of two piston/cylinder units 1 and 2. In the example illustrated, the cylinders of the piston/cylinder units 1 and 2 are articulated on the body 5, while the associated pistons 1' and 2' are articulated on the transverse wishbone 4 by means of piston rods 6 and 7.

A chamber 8, 9 assigned to the upper end face or effective surface area of the piston 1', 2' and a chamber 10, 11 assigned to the lower end face or effective surface area of the piston 1', 2' are located within each of the cylinders of the piston/cylinder units 1 and 2. In this arrangement, the upper effective surface area of each of the pistons 1', 2' is larger than the lower effective surface area by the amount of the cross-section of the associated piston rod 6, 7.

Moreover, the cross-sections of the piston/cylinder units 1 and 2 have such dimensions that the lower annular effective surface area of the piston 1' has the same size as the upper effective surface area of the piston 2'.

The chambers 8 and 11 connected in parallel by means of a line 12 are connected by means of a line 13, to which an accumulator 14 is connected, via an adjustable throttle 15 to a constant-pressure source 16 which is formed by a pump 16', serving for generating pressure and a pressure-limiting valve 16" which serves for adjusting the pressure and which is connected, like the pump 16', to a tank 17 for hydraulic medium.

Since the upper effective surface area of the piston 1' is larger than the lower effective surface area of the piston 2' by the sum of the cross-sections of the piston rods 6 and 7, the pressure generated by the constant-pressure source 16 produces in the chambers 8 and 11 a resultant force which endeavors to pivot the transverse wishbone in the direction of rebound. The pressure generated by the constant-pressure source 16 is such that the static loads produced by the vehicle body 5 are compensated or are only very slightly overcompensated. This pressure is maintained approximately unchanged both during compression and during rebound, because, on the one hand, the accumulator 14 compensates brief pressure variations and, on the other hand, the pump 16' conveys hydraulic medium into the line 13 during rebound and the pressure-limiting valve 16" opens during compression.

The lower chamber 10 of the piston/cylinder unit 1 and the upper chamber 9 of the piston/cylinder unit 2, these chambers 9 and 10 being assigned to effective piston surface areas of equal size, are each connected separately via lines 18 and 19 between which a differential pressure gauge 20 is located, to a change-over means 21 which is designed as a slide valve and which can be controlled by means of a regulating device 22 which, among other things, evaluates the signals generated by the differential pressure gauge 20 wired as an actual value transmitter. Moreover, the regulating device 22 can receive further input signals from sensors (not shown) which record unevenness in the roadway and/or deviations of the transverse wishbone 4 from its center position.

The slide 21' of the change-over means 21 makes it possible, in its two end positions, to connect either of the lines 18 and 19 to a pressure source or pump 23 and the other of these lines 18 and 19, relieved of pressure, to a hydraulic tank 24, so that either the chamber 9 of the piston/cylinder unit 2 is subjected to pressure, with the chamber 10 of the piston/cylinder unit 1 being relieved of the transverse wishbone 4, or the chamber 10 of the piston/cylinder unit 1 is put under pressure, with the chamber 9 of the piston/cylinder unit 2 being relieved of pressure at the same time, to produce a compression movement.

In the middle positions of the slide 21', the lines 18 and 19 can be connected to one another, as illustrated, if appropriate with a throttling effect. Instead of or in addition to this, positions in which the lines 18 and 19 are each shut off are also possible.

Thus, the regulating device 22 is capable of controlling the change-over means 21 as a function of input signals, in particular as a function of signals generated by the differential pressure gauge 20, in such a way that the transverse wishbone 4 executes positively controlled upward or downward pivoting movements to compensate unevenness in the roadway or is brought into its middle position or retained in this middle position.

If appropriate, for example when the vehicle is at a standstill, the regulating device 22 can also adjust the pressure-limiting valve 16" according to the particular static load, that is to say according to the particular weight of the vehicle body 5. Instead of this, this adjustment can also be carried out via separate control means 25, FIG. 1, which are located, for example, between the vehicle body 5 and the transverse wishbone 4 and which respond to deviations of the transverse wishbone 4 from its middle position, if appropriate with a certain time delay.

While we have shown and described only one embodiment in accordance with the present invention, it is understood that the same is not limited thereto but is susceptible to numerous changes and modifications as known to one having ordinary skill in the art, and we therefore do not wish to be limited to the details shown and described herein, but intend to cover all such modifications as are encompassed by the scope of the appended claims.

We claim:

1. An active suspension system for motor vehicles, accepting static as well as dynamic loads, comprising a hydraulic suspension system, preferably designed as a multiple piston and cylinder arrangement, having at least three chambers, a program-controlled regulating device which regulates the pressure in at least one first hydraulic chamber of the suspension device which expands upon extension of the suspension as well as a second hydraulic chamber which expands upon compression of the suspension as a function of operating or driving states, characterized in that the first and second hydraulic chambers undergo equal volume changes during suspension travel, and wherein an additional chamber of the suspension system, which expands upon extension of the suspension, is subjected to a constant pressure which is essentially independent of chamber volume and serves to compensate the static load.

2. An active suspension system according to claim 1, wherein the hydraulic suspension system has two piston and cylinder assemblies with bilaterally loadable pistons with different cross-sectional areas, each piston having an active surface which is smaller on the side containing a piston rod and larger surface facing away from the piston rod, the smaller active surface of the first piston having a larger cross-sectional area than the larger active surface of the other piston, the chamber facing the larger active surface of the first piston connected in parallel with the smaller active surface of the other piston and subject to a constant pressure, and wherein the regulating device determines alternating pressures, possibly differing from one another, in the other two chambers of the piston and cylinder assembly.

3. An active suspension system according to one of claims 1 or 2, wherein a hydraulic reservoir is connected between the chambers subjected to constant pressure and a source of constant pressure which is formed by an adjustable pressure-limiting valve and a pressure source.

4. An active suspension system according to claim 3, wherein an adjustable throttle is disposed in the connection between the constant pressure source and the hydraulic reservoir.

5. An active suspension system according to claim 1, wherein the first and second chambers are each connected by two lines with a switching device controlled by a regulating device, making it possible to connect the two lines with one another, with a predetermined throttle resistance, or to separate them with one line connected to a pressure relief and the other line to said pressure source.

6. An active suspension system according to claim 2, wherein the first and second chambers are each connected by two lines with a switching device controlled by a regulating device, making it possible to connect the two lines with one another, with a predetermined throttle resistance, or to separate them with one line connected to a pressure relief and the other line to said pressure source.

7. An active suspension system according to claim 3, wherein the first and second chambers are each connected by two lines with a switching device controlled by a regulating device, making it possible to connect the two lines with one another, with a predetermined throttle resistance, or to separate them with one line connected to a pressure relief and the other line to said pressure source.

8. An active suspension system according to claim 4, wherein the first and second chambers are each connected by two lines with a switching device controlled by a regulating device, making it possible to connect the two lines with one another, with a predetermined throttle resistance, or to separate them with one line connected to a pressure relief and the other line to said pressure source.

9. An active suspension system according to claim 5, wherein the switching device connected to the pressure relief and to the pressure source can connect either line to the pressure source or to the pressure relief.

10. An active suspension system according to claim 6, wherein the switching device connected to the pressure relief and to the pressure source can connect either line to the pressure source or to the pressure relief.

11. An active suspension system according to claim 7, wherein the switching device connected to the pressure relief and to the pressure source can connect either line to the pressure source or to the pressure relief.

12. An active suspension system according to claim 8, wherein the switching device connected to the pressure relief and to the pressure source can connect either line to the pressure source or to the pressure relief.

* * * * *